(12) United States Patent
Lim et al.

(10) Patent No.: US 11,812,038 B2
(45) Date of Patent: *Nov. 7, 2023

(54) METHOD FOR SCANNING TRANSFORM COEFFICIENT AND DEVICE THEREFOR

(71) Applicant: Electronics and Telecommunications Research Institute, Daejeon (KR)

(72) Inventors: Sung Chang Lim, Daejeon (KR); Hui Yong Kim, Daejeon-si (KR); Se Yoon Jeong, Daejeon-si (KR); Jong Ho Kim, Daejeon-si (KR); Ha Hyun Lee, Seoul (KR); Jin Ho Lee, Daejeon-si (KR); Jin Soo Choi, Daejeon-si (KR); Jin Woong Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,342

(22) Filed: Feb. 10, 2023

(65) Prior Publication Data

US 2023/0199200 A1 Jun. 22, 2023

Related U.S. Application Data

(63) Continuation of application No. 17/377,057, filed on Jul. 15, 2021, now Pat. No. 11,606,567, which is a (Continued)

(30) Foreign Application Priority Data

Mar. 3, 2011 (KR) .......................... 10-2011-0019155
Mar. 5, 2012 (KR) .......................... 10-2012-0022496

(51) Int. Cl.
*H04B 1/66* (2006.01)
*H04N 19/176* (2014.01)
(Continued)

(52) U.S. Cl.
CPC ......... *H04N 19/176* (2014.11); *H04N 19/129* (2014.11); *H04N 19/136* (2014.11)

(58) Field of Classification Search
CPC .. H04N 19/176; H04N 19/136; H04N 19/129; H04N 19/46; H04N 19/61;
(Continued)

(56) References Cited

U.S. PATENT DOCUMENTS

| 5,864,637 A * | 1/1999 | Liu ...................... H04N 19/132 382/250 |
| 2003/0128753 A1* | 7/2003 | Lee ...................... H04N 19/129 375/E7.265 |

(Continued)

FOREIGN PATENT DOCUMENTS

KR 20100035243 A 4/2010

OTHER PUBLICATIONS

Wiegand et al., "WD1: Working Draft 1 Of High-Efficiency Video Coding" (Oct. 7-15, 2010), Joint Collaborative Team On Video Coding (JCT-VC) Of ITU-T SG16 WP3 And ISO/IEC JTC1/SC29/WG11, 3rd Meeting (Year: 2010).*

(Continued)

*Primary Examiner* — Masum Billah
(74) *Attorney, Agent, or Firm* — Shield Intellectual Property PC; Zhichong Gu

(57) ABSTRACT

Provided is a transform coefficient scan method including: determining a reference transform block for a decoding target block; deriving a scanning map of the decoding target block using scanning information of the reference transform block; and performing inverse scanning on a transform coefficient of the decoding target block using the derived scanning map. According to the present invention, picture encoding/decoding efficiency may be improved.

6 Claims, 17 Drawing Sheets

Related U.S. Application Data continuation of application No. 14/001,204, filed as application No. PCT/KR2012/001618 on Mar. 5, 2012, now Pat. No. 11,102,494.

(51) Int. Cl.
*H04N 19/129* (2014.01)
*H04N 19/136* (2014.01)

(58) Field of Classification Search
CPC .. H04N 19/573; H04N 19/105; H04N 19/172; H04N 19/423; H04N 19/51; H04N 19/577; H04N 19/70; H04N 19/52; H04N 19/122; H04N 19/124; H04N 19/132
USPC ............................................. 375/240.18, 240
See application file for complete search history.

(56) References Cited

U.S. PATENT DOCUMENTS

| | | | | |
|---|---|---|---|---|
| 2007/0248164 | A1* | 10/2007 | Zuo | H04N 19/14 375/E7.176 |
| 2008/0170615 | A1 | 7/2008 | Sekiguchi et al. | |
| 2010/0002945 | A1* | 1/2010 | Sugimoto | H04N 19/91 382/238 |
| 2011/0038410 | A1 | 2/2011 | Narroschke et al. | |
| 2013/0051472 | A1* | 2/2013 | Wiegand | H04N 19/34 375/240.18 |
| 2013/0114720 | A1* | 5/2013 | Wang | H04N 19/52 375/240.16 |
| 2013/0329807 | A1 | 12/2013 | Lim et al. | |
| 2016/0309179 | A1* | 10/2016 | Schwarz | H04N 19/50 |
| 2021/0344935 | A1 | 11/2021 | Lim et al. | |

OTHER PUBLICATIONS

Jung et al., "Temporal MV Predictor Modification For MV-Comp, Skip, Direct And Merge Schemes" (Jan. 20-28, 2011), Joint Collaborative Team On Video Coding (JCT-VC) Of ITU-T SG16 WP3 And ISO/IEC JTC1/SC29/WG11, 4th Meeting.
Korean Patent Office, Application No. 10-2012-0022496, Office Action dated Jan. 7, 2020.
Lin et al., "Improved Advanced Motion Vector Prediction" (Jan. 20-28, 2011), Joint Collaborative Team On Video Coding (JCT-VC) Of ITU-T SG16 WP3 And ISO/IEC JTC1/SC29/WG11, 4th Meeting.
United States Patent and Trademark Office, U.S. Appl. No. 14/001,204, Advisory Action dated May 10, 2016.
United States Patent and Trademark Office, U.S. Appl. No. 14/001,204, Advisory Action dated Mar. 14, 2017.
United States Patent and Trademark Office, U.S. Appl. No. 14/001,204, Final Office Action dated Mar. 7, 2016.
United States Patent and Trademark Office, U.S. Appl. No. 14/001,204, Final Office Action dated Jan. 27, 2017.
United States Patent and Trademark Office, U.S. Appl. No. 14/001,204, Final Office Action dated Feb. 22, 2018.
United States Patent and Trademark Office, U.S. Appl. No. 14/001,204, Final Office Action dated Jan. 30, 2019.
United States Patent and Trademark Office, U.S. Appl. No. 14/001,204, Final Office Action dated Feb. 24, 2020.
United States Patent and Trademark Office, U.S. Appl. No. 14/001,204, Final Office Action dated Feb. 8, 2021.
United States Patent and Trademark Office, U.S. Appl. No. 14/001,204, Non-Final Office Action dated Sep. 8, 2015.
United States Patent and Trademark Office, U.S. Appl. No. 14/001,204, Non-Final Office Action dated Aug. 12, 2016.
United States Patent and Trademark Office, U.S. Appl. No. 14/001,204, Non-Final Office Action dated Aug. 14, 2017.
United States Patent and Trademark Office, U.S. Appl. No. 14/001,204, Non-Final Office Action dated Jun. 29, 2018.
United States Patent and Trademark Office, U.S. Appl. No. 14/001,204, Non-Final Office Action dated Aug. 22, 2019.
United States Patent and Trademark Office, U.S. Appl. No. 14/001,204, Non-Final Office Action dated Jul. 24, 2020.
United States Patent and Trademark Office, U.S. Appl. No. 14/001,204, Notice of Allowance dated Apr. 23, 2021.
United States Patent and Trademark Office, U.S. Appl. No. 17/377,057 Non-Final Office Action dated Aug. 18, 2022.
United States Patent and Trademark Office, U.S. Appl. No. 17/377,057 Notice of Allowance dated Nov. 11, 2022.
Wiegand et al., "WD1: Working Draft 1 Of High-Efficiency Video Coding" (Oct. 7-15, 2010), Joint Collaborative Team On Video Coding (JCT-VC) Of ITU-T SG16 WP3 And ISO/IEC JTC1/SC29/WG11, 3rd Meeting.
Wiegand et al., "WD2: Working Draft 2 Of High-Efficiency Video Coding" (Jan. 20-28, 2011), Joint Collaborative Team On Video Coding (JCT-VC) Of ITU-T SG16 WP3 And ISO/IEC JTC1/SC29/WG11, 4th Meeting.
World Intellectual Property Organization, Application No. PCT/KR2012/0001618, International Search Report dated Sep. 26, 2013.

\* cited by examiner

|  |  |  |  |
|---|---|---|---|
| 4 | -1 | 0 | 0 |
| 0 | -3 | 0 | 0 |
| 1 | 0 | 0 | 0 |
| 0 | 0 | 0 | 0 |

1710

| 4 | -1 | 0 | -3 | 0 | 0 | 1 | 0 | 0 | 0 | 0 | 0 | 0 | 0 | 0 | 0 |

1720

METHOD FOR SCANNING TRANSFORM COEFFICIENT AND DEVICE THEREFOR

CROSS-REFERENCE TO RELATED APPLICATIONS

This application is a continuation of U.S. patent application Ser. No. 17/377,057 filed on Jul. 15, 2021, which is a continuation of U.S. patent application Ser. No. 14/001,204 filed on Aug. 23, 2013, now issued as U.S. Pat. No. 11,102,494, which is a National Stage application of International Application No. PCT/KR2012/001618 filed Mar. 5, 2012, which claims benefit under 35 U.S.C. § 119(a) of Korean Patent Applications Nos. 10-2012-0019155 filed on Mar. 3, 2011, and 10-2012-0022496 filed on Mar. 5, 2012 in the Korean Intellectual Property Office, the contents of all of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to picture processing, and more particularly, to a transform coefficient scanning method and apparatus.

BACKGROUND

Recently, in accordance with the expansion of broadcasting services having high definition (HD) resolution in the country and around the world, many users have been accustomed to a high resolution and high definition picture, such that many organizations have attempted to develop the next-generation picture devices. In addition, as the interest in HDTV and ultra high definition (UHD) having a resolution four times higher than that of HDTV have increased, a compression technology for a higher-resolution and higher-definition picture has been demanded.

As the picture compression technology, there are an inter prediction technology of predicting pixel values included in a current picture from a picture before and/or after the current picture, an intra prediction technology of predicting pixel values included in a current picture using pixel information in the current picture, a transform technology of decomposing an original picture signal into a signal of a frequency domain, an inverse transform technology of reconstructing a signal of a frequency domain into an original picture signal, an entropy-encoding technology of allocating a short code to symbols having a high appearance frequency and a long code to symbols having a low appearance frequency, and the like.

BRIEF DESCRIPTION OF THE DRAWINGS

FIG. 13 is a conceptual diagram schematically showing an example of a method of determining a transform coefficient flag value according to an exemplary embodiment of the present invention.

FIG. 17 is a conceptual diagram schematically showing an example of a method of scanning/inverse scanning a transform coefficient of an encoding target block using a scanning map.

BRIEF SUMMARY OF INVENTION

Technical Problem

Figure 1:
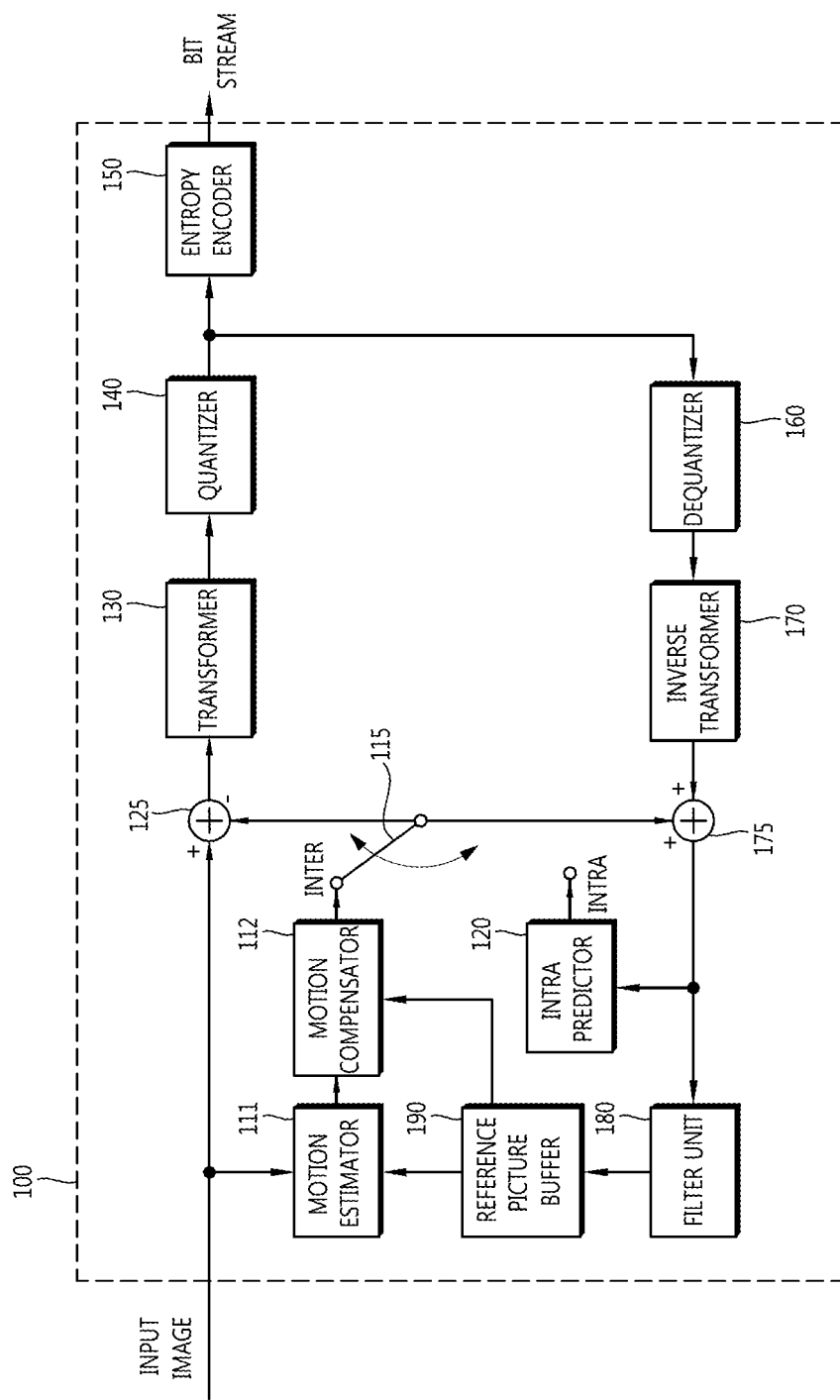
FIG. 1 is a block diagram showing a configuration of a picture encoding apparatus according to an exemplary embodiment of the present invention.

The present invention provides a picture encoding method and apparatus capable of improving picture encoding/decoding efficiency.

The present invention also provides a picture decoding method and apparatus capable of improving picture encoding/decoding efficiency.

The present invention also provides a transform coefficient scanning method and apparatus capable of improving picture encoding/decoding efficiency.

Technical Solution

1. In an aspect, a transform coefficient scan method is provided. The transform coefficient scan method includes: determining a reference transform block for a decoding target block; deriving a scanning map of the decoding target block using scanning information of the reference transform block; and performing inverse scanning on a transform coefficient of the decoding target block using the derived scanning map.

2. In 1, in the determining of the reference transform block, a block present at a position that is the spatially same as that of the decoding target block in a reference picture may be determined as the reference transform block.

3. In 1, in the determining of the reference transform block, at least one of reconstructed neighboring blocks may be determined as the reference transform block, wherein the reconstructed neighboring blocks includes an upper neighboring block adjacent to an upper portion of the decoding target block, a left neighboring block adjacent to the left of the decoding target block, a right upper corner block positioned at a right upper corner of the decoding target block, a left upper corner block positioned at a left upper corner of the decoding target block, and a left lower corner block positioned at a left lower cornet of the decoding target block.

4. In 3, in the determining of the reference transform block, a block having the same size as that of the decoding target block may be determined as the reference transform block.

5. In 3, in the determining of the reference transform block, a block having the same depth as that of the decoding target block may be determined as the reference transform block.

6. In 3, in the determining of the reference transform block, a block having the same encoding parameter as that of the decoding target block may be determined as the reference transform block, wherein the encoding parameter includes at least one of information on an intra prediction direction, a reference picture list, a reference picture index, a motion vector predictor, whether or not a motion information merge is used, whether or not a skip mode is used, a transform kind.

7. In 1, the deriving of the scanning map may include: determining transform coefficient flag values for positions of each transform coefficient in the reference transform block; deriving a counter map for the decoding target block by calculating flag counter values for the positions of each transform coefficient in the reference transform block based on the transform coefficient flag; and generating the scanning map by allocating scan indices to positions of each transform coefficient in the counter map in an ascending order in a sequence in which the flag counter value is high one by one, wherein the transform coefficient flag is a flag indicating whether or not each transform coefficient in the reference transform block is a non-zero transform coefficient, and the flag counter is the sum of the transform coefficient flag values present at the same position in the case in which all of the reference transform blocks are overlapped with each other.

8. In 7, in the case in which a size of the reference transform block is different from that of the decoding target block, the determining of the transform coefficient flag values may include: scaling the reference transform block; and determining transform coefficient flag values for positions of each transform coefficient in the scaled reference transform block, and the deriving of the counter map may include deriving the counter map based on the transform coefficient flag in the scaled reference transform block.

9. In 7, in the generating of the scanning map, the scan indices may be allocated based on a zigzag scan sequence.

10. In another aspect, a picture decoding apparatus is provided. The picture decoding apparatus includes: an inverse scanning unit determining a reference transform block for a decoding target block, deriving a scanning map of the decoding target block using scanning information of the reference transform block, and performing inverse scanning on a transform coefficient of the decoding target block using the derived scanning map; and a reconstructed picture generating unit generating a reconstructed picture based on the inversely scanned transform coefficient.

11. In still another aspect, a picture decoding method is provided. The picture decoding method includes: determining a reference transform block for a decoding target block; deriving a scanning map of the decoding target block using scanning information of the reference transform block; performing inverse scanning on a transform coefficient of the decoding target block using the derived scanning map; and generating a reconstructed picture based on the inversely scanned transform coefficient.

12. In 11, the deriving of the scanning map may include: determining transform coefficient flag values for positions of each transform coefficient in the reference transform block; deriving a counter map for the decoding target block by calculating flag counter values for the positions of each transform coefficient in the reference transform block based on the transform coefficient flag; and generating the scanning map by allocating scan indices to positions of each transform coefficient in the counter map in an ascending order in a sequence in which the flag counter value is high one by one, wherein the transform coefficient flag is a flag indicating whether or not each transform coefficient in the reference transform block is a non-zero transform coefficient, and the flag counter is the sum of the transform coefficient flag values present at the same position in the case in which all of the reference transform blocks are overlapped with each other.

13. In 12, in the case in which a size of the reference transform block is different from that of the decoding target block, the determining of the transform coefficient flag values may include: scaling the reference transform block; and determining transform coefficient flag values for positions of each transform coefficient in the scaled reference transform block, and the deriving of the counter map may include deriving the counter map based on the transform coefficient flag in the scaled reference transform block.

14. In 12, in the generating of the scanning map, the scan indices may be allocated based on a zigzag scan sequence.

Advantageous Effects

With the picture encoding method according to the exemplary embodiment of the present invention, picture encoding/decoding efficiency may be improved.

With the picture decoding method according to the exemplary embodiment of the present invention, picture encoding/decoding efficiency may be improved.

With the transform coefficient scanning method according to the exemplary embodiment of the present invention, picture encoding/decoding efficiency may be improved.

DETAILED DESCRIPTION

Mode for Invention

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention.

Furthermore, constitutional parts shown in the embodiments of the present invention are independently shown so as to represent different characteristic functions. Thus, it does not mean that each constitutional part is constituted in a constitutional unit of separated hardware or one software. In other words, each constitutional part includes each of enumerated constitutional parts for convenience of explanation. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

FIG. 1 is a block diagram showing a configuration of a picture encoding apparatus according to an exemplary embodiment of the present invention.

Referring to FIG. 1, a picture encoding apparatus 100 includes a motion estimator 111, a motion compensator 112, an intra predictor 120, a switch 115, a subtracter 125, a transformer 130, a quantizer 140, an entropy-encoder 150, a dequantizer 160, an inverse transformer 170, an adder 175, a filter unit 180, and a reference picture buffer 190.

The picture encoding apparatus 100 may perform encoding on input pictures in an intra-mode or an inter-mode and output bit streams. In the case of the intra mode, the switch 115 may be switched to intra, and in the case of the inter mode, the switch 115 may be switched to inter. The picture encoding apparatus 100 may generate a prediction block for an input block of the input pictures and then encode a residual between the input block and the prediction block.

In the case of the intra mode, the intra predictor 120 may perform spatial prediction using pixel values of blocks encoded in advance around a current block to generate the prediction block.

In the case of the inter mode, the motion estimator 111 may search a region optimally matched with the input block in a reference picture stored in the reference picture buffer 190 during a motion prediction process to obtain a motion vector. The motion compensator 112 may perform motion compensation using the motion vector to generate the prediction block.

The subtracter 125 may generate a residual block by the residual between the input block and the generated prediction block. The transformer 130 may perform transform on the residual block to output transform coefficients. Here, the transform coefficient means a coefficient value generated by performing transform on the residual block and/or a residual signal. Hereinafter, in the present specification, quantization is applied to the transform coefficient, such that a quantized transform coefficient level may also be called a transform coefficient.

The quantizer 140 may quantize the input transform coefficient according to quantization parameters to output a quantized transform coefficient level.

The entropy-encoder 150 may perform entropy-encoding based on values calculated in the quantizer 140 or encoding parameter values, or the like, calculated during the encoding process to output bit streams.

When the entropy-encoding is applied, symbols are represented by allocating a small number of bits to symbols having high generation probability and allocating a large number of bits to symbols having low generation probability, thereby making it possible to reduce a size of bit streams for the encoding target symbols. Therefore, the compression performance of the picture encoding may be improved through the entropy-encoding. The entropy-encoder 150 may use an encoding method such as exponential golomb, context-adaptive variable length coding (CAVLC), context-adaptive binary arithmetic coding (CABAC), or the like, for the entropy-encoding.

Since the picture encoding apparatus according to the exemplary embodiment of FIG. 1 performs inter prediction encoding, that is, inter-picture prediction encoding, a current encoded picture needs to be decoded and stored in order to be used as a reference picture. Therefore, the quantized coefficient is dequantized in the dequantizer 160 and inversely transformed in the inverse transformer 170. The dequantized and inversely transformed coefficient is added to the prediction block through the adder 175, such that a reconstructed block is generated.

The reconstructed block passes through the filter unit 180 and the filter unit 180 may apply at least one of a deblocking filter, a sample adaptive offset (SAO), and an adaptive loop filter (ALF) to a reconstructed block or a reconstructed picture. The reconstructed block passing through the filter unit 180 may be stored in the reference picture buffer 190.

Figure 2:
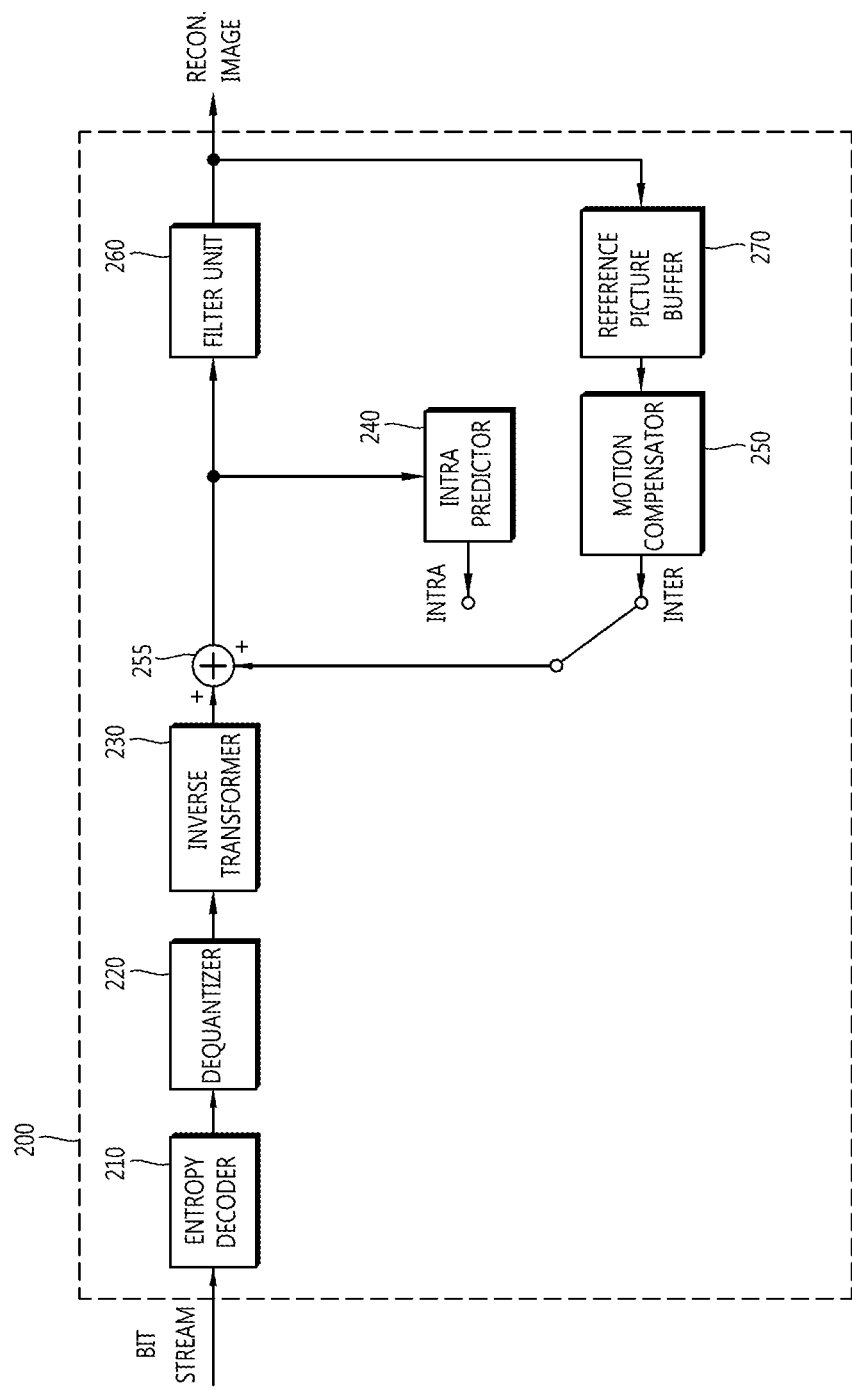
FIG. 2 is a block diagram showing a configuration of a picture decoding apparatus according to an exemplary embodiment of the present invention.

FIG. 2 is a block diagram showing a configuration of a picture decoding apparatus according to an exemplary embodiment of the present invention.

Referring to FIG. 2, a picture decoding apparatus 200 includes an entropy-decoder 210, a dequantizer 220, an inverse transformer 230, an intra predictor 240, a motion compensator 250, an adder 255, a filter unit 260, and a reference picture buffer 270.

The picture decoding apparatus 200 may receive the bit streams output from the encoder to perform the decoding in the intra mode or the inter mode and output the reconstructed picture, that is, a recovered picture. In the case of the intra mode, the switch may be switched to the intra, and in the case of the inter mode, the switch may be switched to the inter. The picture decoding apparatus 200 may obtain a reconstructed residual block from the received bit streams, generate the prediction block, and then add the reconstructed residual block to the prediction block to generate the reconstructed block, that is, a recovered block.

The entropy-decoder 210 may entropy-decode the input bit streams according to the probability distribution to generate symbols including a quantized coefficient type of symbols. The entropy-decoding method is similar to the above-mentioned entropy encoding method.

When the entropy-decoding method is applied, symbols are represented by allocating a small number of bits to symbols having high generation probability and allocating a large number of bits to symbols having low generation probability, thereby making it possible to reduce a size of bit streams for each symbol. Therefore, the picture decoding compression performance may be improved through the entropy-decoding method.

The quantized coefficients may be dequantized in the dequantizer 220 and be inversely transformed in the inverse transformer 230. The quantized coefficients are dequantized/inversely transformed, such that the reconstructed residual block may be generated.

In the case of the intra mode, the intra predictor 240 may perform spatial prediction using pixel values of blocks encoded in advance around a current block to generate the prediction block. In the case of the inter mode, the motion compensator 250 may perform the motion compensation using the motion vector and the reference picture stored in the reference picture buffer 270 to generate the prediction block.

The reconstructed residual block and the prediction block may be added to each other through the adder 255 and the added block may pass through the filter unit 260. The filter unit 260 may apply at least one of the deblocking filter, the SAO, and the ALF to the reconstructed block or the reconstructed picture. The filter unit 260 may output the reconstructed picture, that is, a recovered picture. The reconstructed picture may be stored in the reference picture buffer 270 to thereby be used for the inter prediction.

Hereinafter, a block means a unit of picture encoding and decoding. At the time of the picture coding and decoding, since the encoding or decoding unit means the divided unit when dividing the picture and encoding or decoding the divided pictures, the encoding or decoding unit may be called a macro block, a coding unit (CU), a transform unit (TU), a transform block, or the like. In addition, hereinafter, an encoding/decoding target block means the transform unit and/or the transform block. A single block may be subdivided into sub-blocks having a smaller size.

Figure 3:
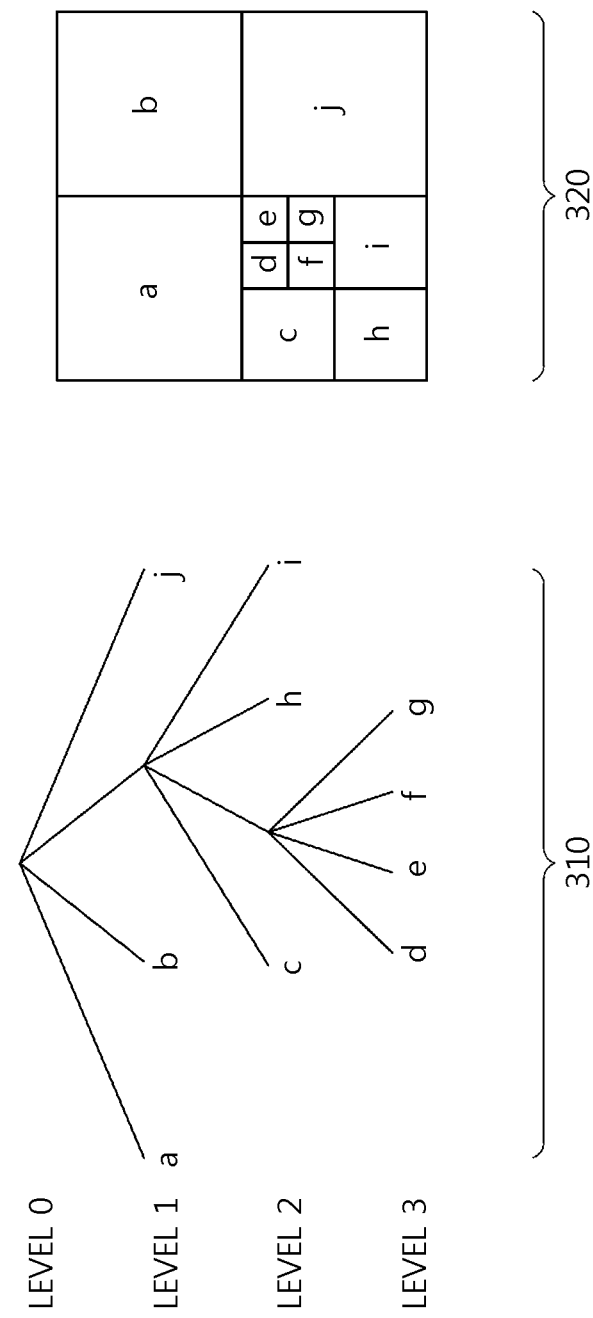
FIG. 3 is a conceptual diagram schematically showing an example in which a single block is divided into a plurality of sub-blocks.

FIG. 3 is a conceptual diagram schematically showing an example in which a single block is divided into a plurality of sub-blocks.

A single block may be hierarchically divided using depth or depth level information based on a tree structure. The respective divided sub-blocks may have a depth value. Here, the depth may indicate the number and/or the degree of divisions of the depth block. Therefore, the depth value may also include information on a size of the sub-block.

Referring to 310 of FIG. 3, an uppermost node may be called a root node and have a smallest depth value. Here, the uppermost node may have a depth of level 0 and indicate an initial block that is not divided.

A lower node having a depth of level 1 may indicate a block divided once from the initial block, and a lower node having a depth of level 2 may indicate a block divided twice from the initial block. For example, in 320 of FIG. 3, a block a corresponding to a node a may be a block divided once from the initial block and have a depth of level 1.

A leaf node of level 3 may indicate a block divided three times from the initial block. For example, in 320 of FIG. 3, a block d corresponding to a node d may be a block divided three times from the initial block and have a depth of level 3. The leaf node of level 3, which is a lowermost node, may have a deepest depth.

Meanwhile, as described above, the encoder may perform transform on the residual block generated after performing the inter prediction and the intra prediction to generate the transform coefficient. When quantization is performed on the transform coefficient, the quantized transform coefficient level may be generated.

In the case of the quantized transform coefficient level, it is likely that a non-zero transform coefficient will be distributed in a low frequency region due to characteristics of transform. Here, the non-zero transform coefficient means a transform coefficient having a non-zero value and/or a transform coefficient level having a non-zero value. Therefore, in order to preferentially encode the non-zero transform coefficient level present in the low frequency region, the encoder may perform scanning before performing entropy-encoding on the transform coefficient level in the encoding target block. Here, the scanning means a process of aligning a sequence of transform coefficients in the transform unit and/or the transform block. As a generally used scanning method, there are a zigzag scan method, a field scan method, and the like.

The decoder may perform entropy-decoding on the transform coefficient level at the time of decoding the picture. Before dequantization and inverse transform are performed on the entropy-decoded transform coefficient level, the decoder may perform inverse scanning in order to determine a position of the decoding target block in which the transform coefficient level is to be included.

In an existing scanning/inverse scanning method, since characteristics of neighboring blocks, or the like, having characteristics similar to those of the encoding/decoding target block are not sufficiently used, there may be a limitation in improving encoding efficiency. Therefore, in order to improve the encoding efficiency, a picture encoding/decoding method and apparatus of selecting a reference transform block in a context-adaptive scheme and performing scanning/inverse scanning on a transform coefficient of an encoding/decoding target block using scanning/inverse scanning information of the reference transform block may be provided.

Figure 4:
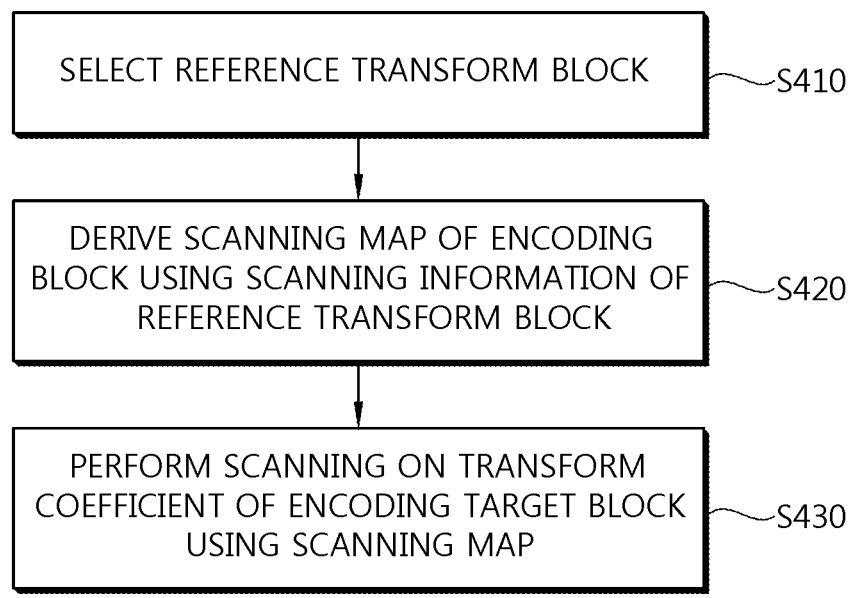
FIG. 4 is a flow chart schematically showing an example of a method of scanning a transform coefficient in an encoder according to an exemplary embodiment of the present invention.

FIG. 4 is a flow chart schematically showing an example of a method of scanning a transform coefficient in an encoder according to an exemplary embodiment of the present invention.

Referring to FIG. 4, the encoder may select a reference transform block for an encoding target block (S410). At this time, the encoder may select blocks other than the encoding target block as the reference transform block, and a size of the selected reference transform block may be N*M (N and M indicate any natural number).

The selected reference transform block may include scanning information. Therefore, the encoder may obtain the scanning information from the selected reference transform block. Here, the scanning information may include a position of a non-zero transform coefficient in the selected reference transform block, a value of the transform coefficient of the selected reference transform block, and the like. Examples of a method of selecting a reference transform block will be described below.

Again referring to FIG. 4, the encoder may derive a scanning map for the encoding target block using the scanning information on the reference transform block (S420).

In the selecting of the reference transform block described above, the number of selected reference transform blocks may be one or two ore more. In the case in which two or more reference transform blocks are selected, the encoder may derive the scanning map using the scanning information of the selected two or more reference transform blocks.

In the selecting of the reference transform block described above, the reference transform block may not also be selected. In the case in which the selected reference transform block is not present, the encoder may determine a predetermined fixed scanning map as a scanning map for the encoding target block. Here, the predetermined fixed scanning map may be a scanning map indicating zigzag scan. Further, in the case in which the selected reference transform block is not present, the encoder may also omit a process of determining the scanning map and perform scanning on the encoding target block using a predetermined fixed scanning method. Here, the predetermined fixed scanning method may be zigzag scan.

A specific example of a method of deriving the scanning map for the encoding target block using the scanning information of the reference transform block will be described below.

Again referring to FIG. 4, the encoder may perform scanning on a transform coefficient of the encoding target block using the derived scanning map (S430). An example of a method of scanning the transform coefficient of the encoding target block will be described below.

Figure 5:
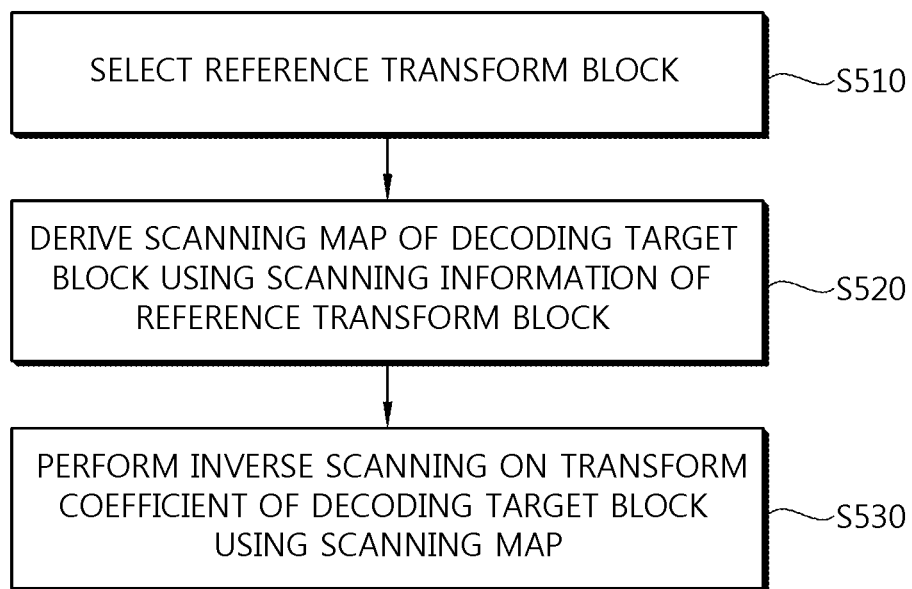
FIG. 5 is a flow chart schematically showing an example of a method of scanning a transform coefficient in a decoder according to an exemplary embodiment of the present invention.

FIG. 5 is a flow chart schematically showing an example of a method of scanning a transform coefficient in a decoder according to an exemplary embodiment of the present invention.

Referring to FIG. 5, the decoder may select a reference transform block for a decoding target block (S510). At this time, the decoder may select blocks other than the decoding target block as the reference transform block, and a size of the selected reference transform block may be N*M (N and M indicate any natural number).

The selected reference transform block may include scanning information. Therefore, the decoder may obtain the scanning information from the selected reference transform block. Here, the scanning information may include a position of a non-zero transform coefficient in the selected reference transform block, a value of the transform coefficient of the selected reference transform block, and the like. The decoder may select the reference transform block using the same method as the method used in the encoder, and examples of a method of selecting the reference transform block will be described below.

Again referring to FIG. 5, the decoder may derive a scanning map for the decoding target block using the scanning information on the reference transform block (S520).

In the selecting of the reference transform block described above, the number of selected reference transform blocks may be one or two ore more. In the case in which two or more reference transform blocks are selected, the decoder may derive the scanning map using the scanning information of the selected two or more reference transform blocks.

In the selecting of the reference transform block described above, the reference transform block may not also be selected. In the case in which the selected reference transform block is not present, the decoder may determine a predetermined fixed scanning map as a scanning map for the decoding target block. Here, the predetermined fixed scanning map may be a scanning map indicating zigzag scan. Further, in the case in which the selected reference transform block is not present, the decoder may also omit a process of determining the scanning map and perform inverse scanning on the decoding target block using a predetermined fixed scanning method. Here, the predetermined fixed scanning method may be zigzag scan.

A method of deriving the scanning map for the decoding target block may be the same as the method of deriving the scanning map in the encoder. A specific example of a method of deriving the scanning map for the decoding target block using the scanning information of the reference transform block will be described below.

Again referring to FIG. 5, the decoder may perform inverse scanning on a transform coefficient of the decoding target block using the derived scanning map (S530). An example of a method of inversely scanning the transform coefficient of the encoding target block will be described below.

Hereinafter, the following examples will be described based on the encoder for convenience. However, unless particularly stated, they may also be applied to the decoder in the same scheme. In this case, the encoding target block may be interpreted as being the decoding target block, and the scanning may be interpreted as being inverse scanning.

Figure 6:
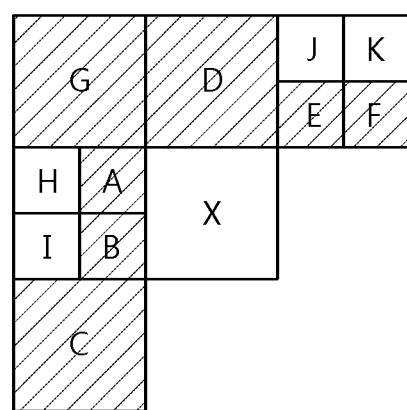
FIG. 6 is a conceptual diagram schematically showing an example of a method of selecting reference transform block according to an exemplary embodiment of the present invention.

FIG. 6 is a conceptual diagram schematically showing an example of a method of selecting reference transform block according to an exemplary embodiment of the present invention.

The encoder may select reconstructed neighboring blocks as reference transform blocks for an encoding target block. Here, the reconstructed neighboring blocks, which are blocks previously encoded or decoded to thereby be reconstructed, may include a block adjacent to the encoding/decoding target block, a block positioned at a right upper corner of the encoding/decoding target block, a block positioned at a left upper corner of the encoding/decoding target block, and/or a block positioned at a left lower corner of the encoding/decoding target block. Hereinafter, a block adjacent to an upper portion of the encoding target block will be called an upper neighboring block, and a block adjacent to a left of the encoding target block will be called a left neighboring block. In addition, a block positioned at a right upper corner of the encoding target block will be called a right upper corner block, a block positioned at a left upper corner of the encoding target block will be called a left upper corner block, and a block positioned at a left lower corner of the encoding target block will be called a left lower corner block.

In the example of FIG. 6, a block X indicates an encoding target block, and blocks A, B, C, D, E, F, and G indicate reconstructed neighboring blocks. Referring to FIG. 6, the encoder may select at least one of left neighboring blocks A and B, an upper neighboring block D, right upper corner blocks E and F, a left upper corner block G, and a left lower corner block C as the reference transform block.

Figure 7:
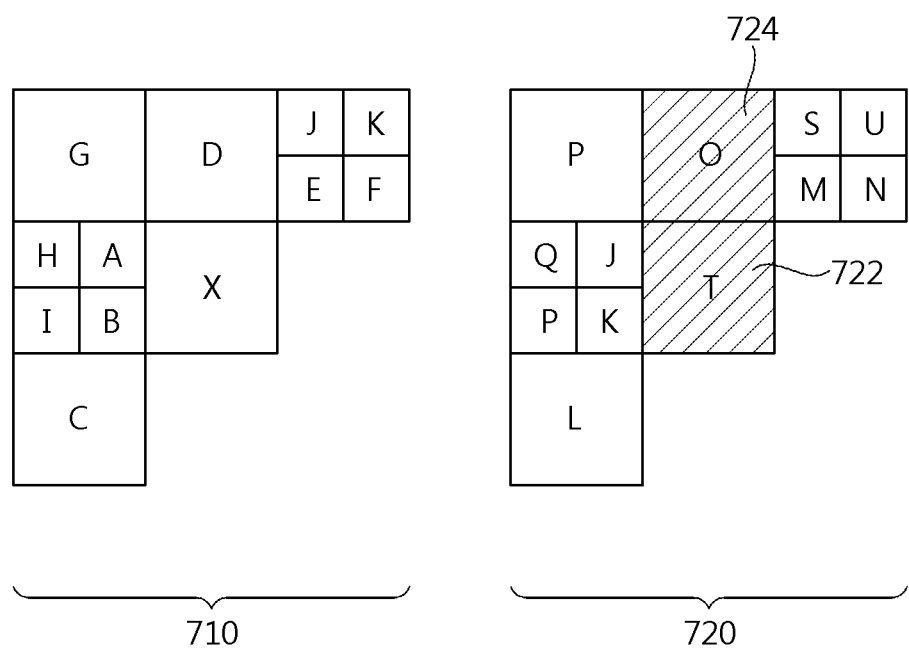
FIG. 7 is a conceptual diagram schematically showing another example of a method of selecting a reference transform block according to an exemplary embodiment of the present invention.

FIG. 7 is a conceptual diagram schematically showing another example of a method of selecting a reference transform block according to an exemplary embodiment of the present invention.

710 of FIG. 7 indicates a block in an encoding target picture, and 720 of FIG. 7 indicates a collocated block in a reference picture. Here, the collocated block means a block present at a position that is the spatially same as that of a block in the encoding target picture within the reference picture. A block X shown in 710 of FIG. 7 indicates an encoding target block.

The encoder may determine a reference transform block for the encoding target block among blocks in the reference picture. Referring to FIG. 7, as an example, the encoder may select at least one of a block T 722 and a block O 724 in the reference picture as the reference transform block. Here, the block T 722 may be a collocated block for the encoding target block, and the block O 724 may be a collocated block for the upper neighboring block. In addition, the encoder may select the block T 722 present at a position that is the spatially same as that of a block in the encoding target picture among the blocks in the reference picture as the reference transform block.

Figure 8:
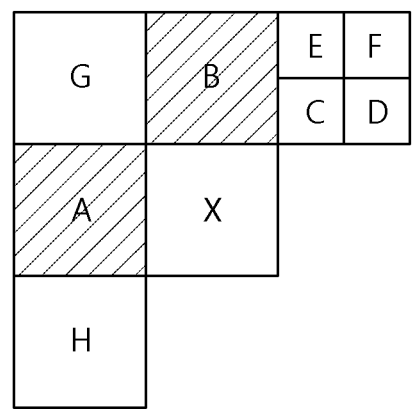
FIG. 8 is a conceptual diagram schematically showing still another example of a method of selecting a reference transform block according to an exemplary embodiment of the present invention.

FIG. 8 is a conceptual diagram schematically showing still another example of a method of selecting a reference transform block according to an exemplary embodiment of the present invention. A block X shown in FIG. 8 indicates an encoding target block.

The encoder may select blocks present at predetermined relative positions for the encoding target block as the reference transform block for the encoding target block. Referring to FIG. 8, as an example, the encoder may select at least one of a left neighboring block A adjacent to the left of the encoding target block X and an upper neighboring block B adjacent to an upper portion of the encoding target block X as the reference transform block for the encoding target block.

Figure 9:
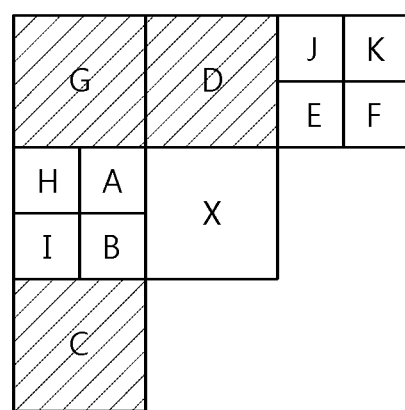
FIG. 9 is a conceptual diagram schematically showing still another example of a method of selecting a reference transform block according to an exemplary embodiment of the present invention.

FIG. 9 is a conceptual diagram schematically showing still another example of a method of selecting a reference transform block according to an exemplary embodiment of the present invention. A block X shown in FIG. 9 indicates an encoding target block.

The encoder may select blocks having the same size as that of the encoding target block as the reference transform block for the encoding target block. Here, the reference transform block may be selected among reconstructed neighboring blocks by way of example.

Referring to FIG. 9, the blocks having the same size as the encoding target block X among the reconstructed neighboring block are a left lower corner block C, a left upper corner block G, and an upper neighboring block D. Here, the encoder may determine at least one of the left lower corner block G, the left upper corner block G, and the upper neighboring block D having the same size as that of the encoding target block X as the reference transform block for the encoding target block X.

Figure 10:
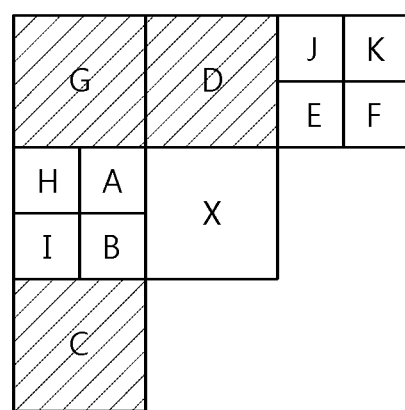
FIG. 10 is a conceptual diagram schematically showing still another example of a method of selecting a reference transform block according to an exemplary embodiment of the present invention.

FIG. 10 is a conceptual diagram schematically showing still another example of a method of selecting a reference transform block according to an exemplary embodiment of the present invention. A block X shown in FIG. 10 indicates an encoding target block.

The encoder may select blocks having the same depth value as that of the encoding target block as the reference transform block for the encoding target block. Here, the reference transform block may be selected among reconstructed neighboring blocks by way of example.

Referring to FIG. 10, the blocks having the same depth value as the encoding target block X among the reconstructed neighboring block are a left lower corner block C, a left upper corner block G, and an upper neighboring block D. Here, the encoder may determine at least one of the left lower corner block C, the left upper corner block G, and the upper neighboring block D having the same depth value as that of the encoding target block X as the reference transform block for the encoding target block X.

Figure 11:
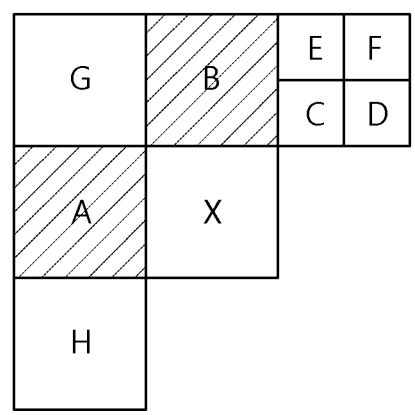
FIG. 11 is a conceptual diagram schematically showing still another example of a method of selecting a reference transform block according to an exemplary embodiment of the present invention.

FIG. 11 is a conceptual diagram schematically showing still another example of a method of selecting a reference transform block according to an exemplary embodiment of the present invention. A block X shown in FIG. 11 indicates an encoding target block.

The encoder may select blocks having an encoding parameter equal or similar to that of the encoding target block as the reference transform block for the encoding target block. Here, the reference transform block may be selected among reconstructed neighboring blocks by way of example. Here, the encoding parameter may include information that may be inferred during an encoding or decoding process as well as information that is encoded in the encoder and is transmitted to the decoder, such as a syntax element, and means information required when the picture is encoded or decoded. The encoding parameter may include, for example, an intra prediction direction, a block size, a reference picture list, a reference picture index, a motion vector predictor, whether or not a motion information merge is used, whether or not a skip mode is used, a transform kind, and the like.

In the example of FIG. 11, it is assumed that a left neighboring block A and an upper neighboring block B among the reconstructed neighboring blocks have an encoding parameter equal or similar to that of the encoding target block X. Here, the encoder may determine at least one of the left neighboring block A and the upper neighboring block B as the reference transform block for the encoding target block X.

The block having the encoding parameter equal or similar to that of the encoding target block may be determined by various methods. Hereinafter, examples of the block having the encoding parameter equal or similar to that of the encoding target block will be described.

As an example, it is likely that a block to which a reference sample or a reference pixel used for intra prediction of the encoding target block belongs will include information equal or similar to that of the encoding target block. Therefore, the encoder may select the block to which the reference sample or the reference pixel used for intra prediction of the encoding target block belongs as the reference transform block for the encoding target block.

In addition, a motion vector predictor and a motion vector predictor index may be used for inter prediction of the encoding target block. Here, the encoder may select blocks having the same motion vector predictor as that of the encoding target block and the same motion vector predictor index as that of the encoding target block as the reference transform block. The selected reference transform block may have the same motion vector as that of the motion vector predictor for the encoding target block as the motion vector predictor.

In addition, a reference picture index may be used for inter prediction of the encoding target block. Here, the encoder may select a block having the same reference picture index as that of the encoding target block as the reference transform block.

In addition, a motion information merge may be used for inter prediction of the encoding target block. In the case in which the motion information merge is used, the encoder may use at least one of spatial motion information derived from the reconstructed neighboring block and temporal motion information derived from the reference picture as motion information of the encoding target block. Here, the spatial motion information and the temporal motion information may be called a merge candidate. In the motion information merge, a merge index indicating which of merge candidates is used as the motion information of the encoding target block may be used.

Here, the encoder may select a block that becomes a merge target of the encoding target block as the reference transform block for the encoding target block. For example, the encoder may select a block corresponding to the merge target indicated by the merge index of the encoding target block as the reference transform block for the encoding target block.

Figure 12:
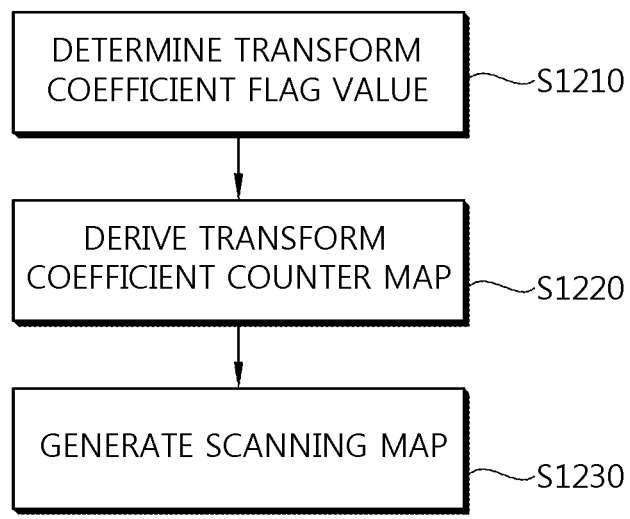
FIG. 12 is a flow chart schematically showing an example of a method of deriving a scanning map for an encoding target block.

FIG. 12 is a flow chart schematically showing an example of a method of deriving a scanning map for an encoding target block.

As described above, the encoder may derive the scanning map for the encoding target block using the scanning information of the reference transform block. Here, the scanning information may include a position of a non-zero transform coefficient in the reference transform block, a value of the transform coefficient of the selected reference transform block, and the like.

Referring to FIG. 12, the encoder may determine transform coefficient flag values for positions of each transform coefficient in the reference transform block (S1210).

As an example, a transform coefficient flag value of 1 may be allocated to a position of a non-zero transform coefficient, and a transform coefficient flag value of 0 may be allocated to a position of a transform coefficient that is not the non-zero transform coefficient. In this case, the transform coefficient flag may indicate whether or not the transform coefficient in the reference transform block is the non-zero transform coefficient.

In addition, in the case in which sizes of the reference transform block and the encoding target block are different, the encoder may scale the reference transform block so as to correspond to a size of the encoding target block. In this case, the encoder may determine the transform coefficient flag values with respect to the positions of each transform coefficient in the scaled reference transform block.

A specific example of a method of determining the transform coefficient flag value will be described below.

Again referring to FIG. 12, the encoder may derive a transform coefficient counter map for the encoding target block (S1220).

The encoder may calculate flag counter values for the positions of each transform coefficient in the reference transform block, and the transform coefficient counter map may be derived by the calculated flag counter value. Here, the flag counter means the sum of the transform coefficient flag values present at the same positions in a plurality of reference transform blocks. That is, the flag counter means the sum of the transform coefficient flag values present at the same positions in the case in which the plurality of reference transform blocks are overlapped with each other.

In addition, as described above, the case in which the sizes of the reference transform block and the encoding target block are different may also be generated. In this case, the encoder may derive the transform coefficient counter map using the transform coefficient flag value of the scaled reference transform block.

A specific example of a method of deriving the transform coefficient counter map will be described below.

Again referring to FIG. 12, the encoder may generate a scanning map for the encoding target block (S1230).

The encoder may generate the scanning map by allocating scan indices to each transform coefficient position in the counter map in a sequence in which a flag counter value is high, based on a zigzag scan sequence. Here, the scan index may be allocated in a sequence in which an index value is low, starting from 0. In addition, in the case in which a plurality of positions having the same flag counter value are present, a low scan index value may be allocated to a transform coefficient position at which a priority of the zigzag scan is high.

A scan index value may be allocated to a plurality of transform coefficient positions having a flag counter value of 0 based on a zigzag scan sequence. In this case, the scan index may be allocated in the zigzag scan sequence and be allocated in a sequence in which an index value is low.

When the scanning map is generated, the encoder may scan transform coefficients of the encoding target block in a sequence in which the allocated scan index value is low. A specific example of a method of generating the scanning map will be described below.

Figure 13:
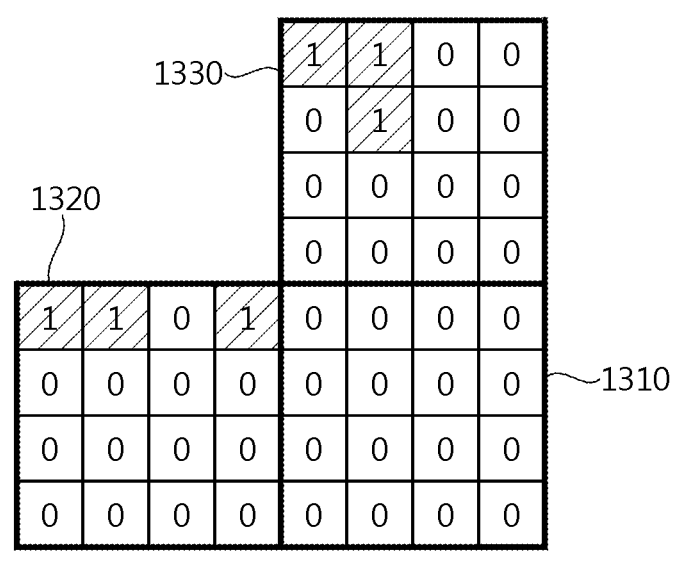

FIG. 13 is a conceptual diagram schematically showing an example of a method of determining a transform coefficient flag value according to an exemplary embodiment of the present invention.

FIG. 13 shows an encoding target block 1310, a left neighboring block 1320, and an upper neighboring block 1330. The left neighboring block 1320 and the upper neighboring block 1330 indicate reference transform blocks selected by the encoder. In the example of FIG. 13, it is assumed that each of the encoding target block 1310, the left neighboring block 1320, and the upper neighboring block 1330 has a size of 4×4.

As described above, the encoder may determine the transform coefficient flag values for positions of each transform coefficient in the reference transform block. As an example, a transform coefficient flag value of 1 may be allocated to a position of a non-zero transform coefficient, and a transform coefficient flag value of 0 may be allocated to a position of a transform coefficient that is not the non-zero transform coefficient. In this case, the transform coefficient flag may indicate whether or not the transform coefficient in the reference transform block is the non-zero transform coefficient. In the example of FIG. 13, numbers allocated to positions of each transform coefficient in the reference transform block indicate examples of the transform coefficient flag value.

Referring to FIG. 13, in the case of the left neighboring block 1320, the non-zero transform coefficients are present at first, second, and fourth positions in a raster scan sequence. Therefore, the transform coefficient flag value of 1 may be allocated to the position at which the non-zero transform coefficient is present, and the transform coefficient flag value of 0 may be allocated to the position at which the non-zero transform coefficient is not present.

Further, in the case of the upper neighboring block 1330, the non-zero transform coefficients are present at first, second, and sixth positions in a raster scan sequence. Therefore, the transform coefficient flag value of 1 may be allocated to the position at which the non-zero transform coefficient is present, and the transform coefficient flag value of 0 may be allocated to the position at which the non-zero transform coefficient is not present.

Figure 14:
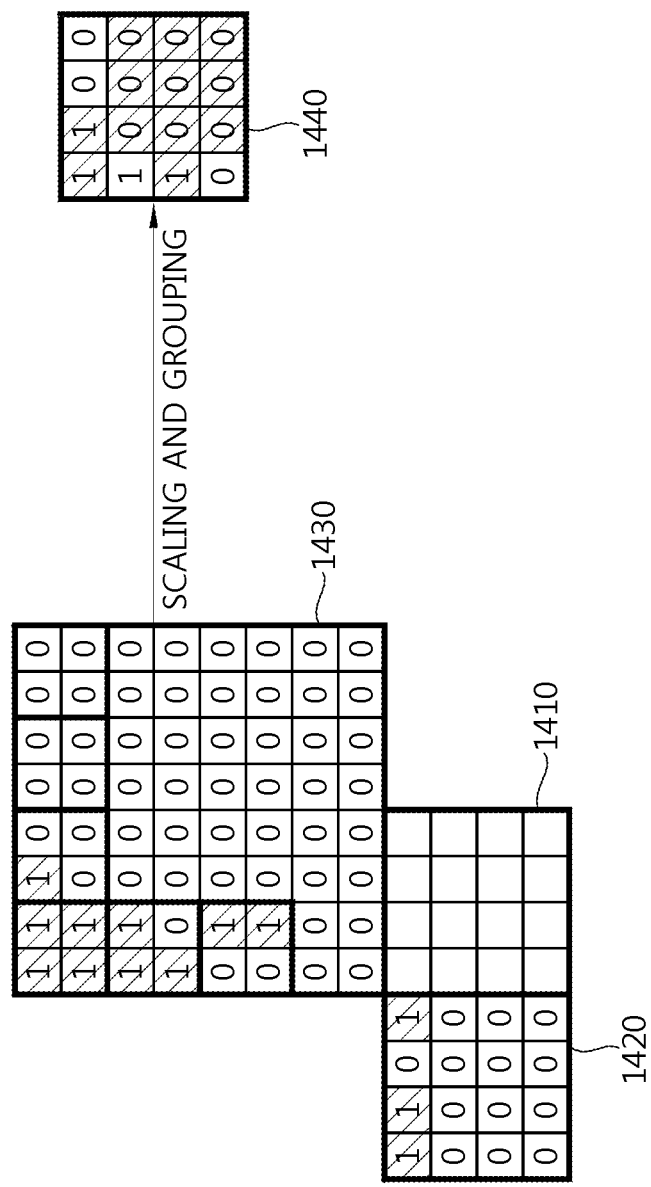
FIG. 14 is a conceptual diagram schematically showing another example of a method of determining a transform coefficient flag value according to an exemplary embodiment of the present invention.

FIG. 14 is a conceptual diagram schematically showing another example of a method of determining a transform coefficient flag value according to an exemplary embodiment of the present invention.

FIG. 14 shows an encoding target block 1410, a left neighboring block 1420, and an upper neighboring block 1430. The left neighboring block 1420 and the upper neighboring block 1430 indicate reference transform blocks selected by the encoder. In the example of FIG. 14, the encoding target block 1410 and the left neighboring block 1420 have a size of 4×4, and the upper neighboring block 1430 has a size of 8×8.

As described above, in the case in which sizes of the reference transform block and the encoding target block are different, the encoder may scale the reference transform block so as to correspond to a size of the encoding target block. In this case, the encoder may determine the transform coefficient flag values with respect to the positions of each transform coefficient in the scaled reference transform block.

Referring to FIG. 14, the upper neighboring block 1430 among the reference transform blocks may have a size larger than that of the encoding target block 1410. In the case in which the reference transform block has a size larger than that of the encoding target block, the encoder may scale the reference transform block so as to correspond to the size (4×4) of the encoding target block. 1440 of FIG. 14 indicates a scaled reference transform block.

The encoder may determine the transform coefficient flag values with respect to the positions of each transform coefficient in the scaled reference transform block 1440. To this end, the encoder may group transform coefficient flags present in the reference transform block 1430 before being scaled into a plurality of groups. Here, each of the groups may correspond to each transform coefficient position in the scaled reference transform block 1440. In this case, when at least one of the transform coefficient flag values included in one specific group is 1, a transform coefficient flag value of 1 may be allocated to a position of a corresponding transform coefficient position (a transform coefficient position in the scaled reference transform block 1440). In addition, when all of the transform coefficient flag values included in one specific group are 0, the transform coefficient flag value of 0 may be allocated to a position of corresponding transform coefficient positions (transform coefficient positions in the scaled reference transform block 1440).

Unlike the example of FIG. 14, the reference transform block may also have a size smaller that that of the encoding target block. In the case in which the reference transform block has a size smaller than that of the encoding target block, the encoder may scale the reference transform block so as to correspond to the size of the encoding target block. Here, each transform coefficient flag present in the reference transform block before being scaled may correspond to at least one transform coefficient position present in the scaled reference transform block. In this case, the encoder may allocate the transform coefficient flag in the reference transform block before being scaled to a corresponding transform coefficient position (a transform coefficient position in the scaled reference transform block). That is, the transform coefficient flag in the reference transform block before being scaled may be scaled and then allocated to a corresponding position.

Figure 15:
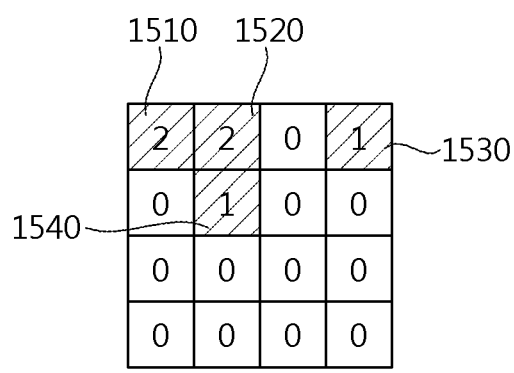
FIG. 15 is a conceptual diagram schematically showing an example of a method of deriving a transform coefficient counter map according to an exemplary embodiment of the present invention.

FIG. 15 is a conceptual diagram schematically showing an example of a method of deriving a transform coefficient counter map according to an exemplary embodiment of the present invention.

In the example of FIG. 15, it is assumed that the encoding target block has a size of 4×4 and reference transform blocks and transforms coefficient flag values in each reference transform block are determined to be the same as those of the example of FIG. 13. That is, the encoder selects a left neighboring block and an upper neighboring block as the reference transform block. Here, in the case of the left neighboring block, it is assumed that a transform coefficient flag value of 1 is allocated to first, second, and fourth positions in a raster scan sequence, and in the case of the upper neighboring block, it is assumed that a transform coefficient flag value of 1 is allocated to first, second, and sixth positions in a raster scan sequence.

As described above, the encoder may calculate flag counter values for the positions of each transform coefficient in the reference transform block, and the transform coefficient counter map may be derived by the calculated flag counter value. Here, the flag counter means the sum of the transform coefficient flag values present at the same positions in a plurality of reference transform blocks. That is, the flag counter means the sum of the transform coefficient flag values present at the same positions in the case in which the plurality of reference transform blocks are overlapped with each other.

FIG. 15 shows an example of a transform coefficient counter map derived according to the exemplary embodiment of the present invention. As described above, in the example of FIG. 15, the transform coefficient flag value at the first and second positions of the left neighboring block in the raster scan sequence is 1, and the transform coefficient flag value at the first and second positions of the upper neighboring block in the raster scan sequence is 1. Therefore, the flag counter value of the first position 1510 and the second position 1520 of the transform coefficient counter map in the raster scan sequence may be 2.

In addition, the transform coefficient flag value of the fourth position in the left neighboring block in the raster scan sequence is 1, and the transform coefficient flag value of the fourth position in the upper neighboring block in the raster scan sequence is 0. Therefore, the flag counter value of the fourth position 1530 of the transform coefficient counter map in the raster scan sequence may be 1. In addition, the transform coefficient flag value of the sixth position in the left neighboring block in the raster scan sequence is 0, and the transform coefficient flag value of the sixth position in the upper neighboring block in the raster scan sequence is 1. Therefore, the flag counter value of the sixth position 1540 of the transform coefficient counter map in the raster scan sequence may be 1.

Meanwhile, as described above, the case in which the sizes of the reference transform block and the encoding target block are different may also be generated. In this case, the encoder may derive the transform coefficient counter map using the transform coefficient flag value of the scaled reference transform block.

Figure 16:
FIG. 16 is a conceptual diagram schematically showing an example of a method of generating a scanning map according to an exemplary embodiment of the present invention.
Figure 16:

FIG. 16 is a conceptual diagram schematically showing an example of a method of generating a scanning map according to an exemplary embodiment of the present invention.

As described above, the encoder may generate the scanning map by allocating the scan indices to each transform coefficient position in the counter map in a sequence in which a flag counter value is high, based on a zigzag scan sequence. In the example of FIG. 16, it is assumed that the counter map shown in FIG. 15 is used for generating the scanning map.

1610 of FIG. 16 indicates a zigzag scan sequence. In 1610 of FIG. 16, numbers indicated in each transform coefficient position indicate scan index values of the zigzag scan. In the case in which the zigzag scan is applied, the scanning may be performed in a sequence in which the scan index value in 1610 of FIG. 16 is low.

1620 of FIG. 16 indicates a scanning map in which scan indices are allocated, derived according to the exemplary embodiment of the present invention. In 1620 of FIG. 16, numbers indicated in each transform coefficient position indicate scan index values.

Referring to 1620 of FIG. 16, the encoder may allocate the scan indices to each transform coefficient position in the counter map in a sequence in which a flag counter value is high. Here, the scan index may be allocated in a sequence in which an index value is low, starting from 0. In addition, in the case in which a plurality of positions having the same flag counter value are present, a low scan index value may be allocated to a transform coefficient position at which a priority of the zigzag scan is high.

A scan index value may be allocated to a plurality of transform coefficient positions having a flag counter value of 0 based on a zigzag scan sequence. In this case, the scan index may be allocated to each transform coefficient position in the counter map in the zigzag scan sequence and be allocated in a sequence in which an index value is low.

When the scanning map is generated, the encoder may scan transform coefficients of the encoding target block in a sequence in which the allocated scan index value is low.

FIG. 17 is a conceptual diagram schematically showing an example of a method of scanning/inverse scanning a transform coefficient of an encoding target block using a scanning map.

1710 of FIG. 17 indicates a two-dimensional transform coefficient for the encoding/decoding target block, and 1720 of FIG. 17 indicates a one-dimensional transform coefficient arrangement corresponding to the two-dimensional transform coefficient. In the example of FIG. 17, it is assumed that the scanning map shown in 1620 of FIG. 16 is used for scanning/inverse scanning.

Referring to FIG. 17, the encoder may scan the transform coefficients of the encoding target block in a sequence in which the scan index value allocated to the scanning map is low. In this case, the two-dimensional transform coefficient 1710 of the encoding target block may be scanned and encoded in a sequence of the one-dimensional transform coefficient arrangement shown in 1720 of FIG. 17.

For example, in FIG. 17, since a scan index value 0 is allocated to a transform coefficient 4, the transform coefficient 4 may be first scanned. In addition, other transform coefficients may also be scanned in a sequence in which the scan index values allocated to each transform coefficient is low.

The decoder may perform entropy-decoding on the transform coefficient in the sequence of the one-dimensional transform coefficient arrangement shown in 1720 of FIG. 17 during a decoding process. When the entropy-decoding is performed on the transform coefficient, the decoder performs the inverse scanning on the transform coefficient using the scanning map, thereby making it possible to allocate the transform coefficient to the two-dimensional decoding target block. For example, the decoder may perform inverse scanning on the decoding target block in a sequence in which the scan index value allocated to the scanning map is low. That is, the decoder may allocate the transform coefficient to the two-dimensional decoding target block in a sequence in which the scan index value allocated to the scanning map is low.

With the above-mentioned examples, the encoder and the decoder may select the reference transform block in a context-adaptive scheme using similarity between the encoding/decoding target block and the reconstructed neighboring block. In this case, the encoder and the decoder perform the scanning/inverse scanning on the transform coefficient in the encoding/decoding target block using the scanning information of the selected reference transform block, thereby making it possible to improve encoding efficiency.

In the above-mentioned exemplary embodiments, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. An image encoding method comprising:
    generating a prediction block of a current block included in a current picture based at least in part on motion information of the current block;
    generating a residual block based on the current block and the prediction block;
    generating a transform coefficient for the residual block by transforming the residual block; and
    encoding the motion information of the current block and the transform coefficient,
    wherein the current block is encoded by referring to a spatially neighboring block or a temporally neighboring block,
    wherein the temporally neighboring block is determined by selecting one block among maximum two candidate blocks included in a reference picture based on encoding parameters of the maximum two candidate blocks, the encoding parameters including reference picture indices for the maximum two candidate blocks, the reference picture being different from the current picture, the maximum two candidate blocks including a collocated block of the current block and a block spatially adjacent to the collocated block, and the encoding parameters being included in a bitstream, and
    wherein, in case the current block is encoded by referring to the temporally neighboring block, the temporally neighboring block has the same motion information as the current block;
    wherein the residual block is generated by subtracting the prediction block from the current block; and
    transmitting the encoding parameters, as included in the bitstream, from an image encoding device to an image decoding device.

2. The image encoding method of claim 1, wherein the encoding the motion information is performed by using at least one among exponential golomb, context-adaptive variable length coding (CAVLC) and context-adaptive binary arithmetic coding (CABAC).

3. An image decoding method, comprising:
obtaining a transform coefficient of a current block;
obtaining a residual block of the current block based on the transform coefficient;
generating a prediction block of the current block included in a current picture based at least in part on reconstructed motion information of the current block; and
reconstructing the current block based on the generated prediction block and the residual block of the current block,
wherein the current block is decoded by referring to a spatially neighboring block or a temporally neighboring block,
wherein the temporally neighboring block is determined by selecting one block among maximum two candidate blocks included in a reference picture based on encoding parameters of the two blocks, the encoding parameters including reference picture indices for the maximum two candidate blocks, the reference picture being different from the current picture, the maximum two candidate blocks including a collocated block of the current block and a block spatially adjacent to the collocated block, and the encoding parameters being included in a bitstream,
wherein the current block is reconstructed by adding the residual block and the prediction block; and
wherein, in case the current block is decoded by referring to the temporally neighboring block, the temporally neighboring block has the same motion information as the current block.

4. The image decoding method of claim 3, wherein the reconstructing the motion information is performed by using at least one among exponential golomb, context-adaptive variable length coding (CAVLC) and context-adaptive binary arithmetic coding (CABAC).

5. A non-transitory computer-readable medium storing a bitstream that is generated by an image encoding method, the method comprising:
generating a prediction block of a current block included in a current picture based at least in part on motion information of the current block;
generating a residual block based on the current block and the prediction block;
generating a transform coefficient for the residual block by transforming the residual block; and
encoding the motion information of the current block and the transform coefficient,
wherein the current block is encoded by referring to a spatially neighboring block or a temporally neighboring block,
wherein the temporally neighboring block is determined by selecting one block among maximum two candidate blocks included in a reference picture based on encoding parameters of the maximum two candidate blocks, the encoding parameters including reference picture indices for the maximum two candidate blocks, the reference picture being different from the current picture, the maximum two candidate blocks including a collocated block of the current block and a block spatially adjacent to the collocated block, and the encoding parameters being included in a bitstream, and
wherein, in case the current block is encoded by referring to the temporally neighboring block, the temporally neighboring block has the same motion information as the current block;
wherein the residual block is generated by subtracting the prediction block from the current block; and
transmitting the encoding parameters, as included in the bitstream, from an image encoding device to an image decoding device.

6. A non-transitory computer-readable medium storing a bitstream which is received by an image decoding apparatus and decoded to reconstruct a current block included in a current picture,
a prediction block of the current block being generated based at least in part on reconstructed motion information of the current block,
the prediction block being used with a residual block to reconstruct the current block,
wherein the current block is decoded by referring to a spatially neighboring block or a temporally neighboring block,
wherein the temporally neighboring block is determined by selecting one block among maximum two candidate blocks included in a reference picture based on encoding parameters of the maximum two candidate blocks, the encoding parameters including reference picture indices for the maximum two candidate blocks, the reference picture being different from the current picture, the maximum two candidate blocks including a collocated block of the current block and a block spatially adjacent to the collocated block, and the encoding parameters being included in a bitstream,
wherein the current block is reconstructed by adding the residual block and the prediction block;
wherein the residual block of the current block is obtained based on a transform coefficient,
wherein, in case the current block is decoded by referring to the temporally neighboring block, the temporally neighboring block has the same motion information as the current block.

* * * * *